US012662421B2

(12) United States Patent
Daubresse et al.

(10) Patent No.: US 12,662,421 B2
(45) Date of Patent: Jun. 23, 2026

(54) SLAG-BASED HYDRAULIC BINDER, DRY MORTAR COMPOSITION COMPRISING SAME AND SYSTEM FOR ACTIVATING A SLAG-BASED BINDER

(71) Applicant: SIKA TECHNOLOGY AG, Baar (CH)

(72) Inventors: Anne Daubresse, Saint Quentin Fallavier (FR); Etienne Gueret, Lyons (FR); Virginie Perret, Saint Julien de l'Herms (FR); Mélanie Lechevalier, Villefontaine (FR)

(73) Assignee: SIKA TECHNOLOGY AG, Baar (CH)

( * ) Notice: Subject to any disclaimer, the term of this patent is extended or adjusted under 35 U.S.C. 154(b) by 743 days.

(21) Appl. No.: 17/911,088

(22) PCT Filed: Mar. 5, 2021

(86) PCT No.: PCT/EP2021/055660
§ 371 (c)(1),
(2) Date: Sep. 12, 2022

(87) PCT Pub. No.: WO2021/180594
PCT Pub. Date: Sep. 16, 2021

(65) Prior Publication Data
US 2023/0142698 A1      May 11, 2023

(30) Foreign Application Priority Data

Mar. 13, 2020    (FR) ....................................... 2002491

(51) Int. Cl.
| | |
|---|---|
| *C04B 7/153* | (2006.01) |
| *C04B 7/19* | (2006.01) |
| *C04B 7/32* | (2006.01) |
| *C04B 11/30* | (2006.01) |
| *C04B 28/04* | (2006.01) |
| *C04B 28/08* | (2006.01) |
| *C04B 28/14* | (2006.01) |

(52) U.S. Cl.
CPC .............. *C04B 7/1535* (2013.01); *C04B 7/19* (2013.01); *C04B 7/323* (2013.01); *C04B 11/30* (2013.01); *C04B 28/04* (2013.01); *C04B 28/082* (2013.01); *C04B 28/14* (2013.01)

(58) Field of Classification Search
CPC ......... C04B 7/1535; C04B 7/19; C04B 7/323; C04B 11/30; C04B 28/04; C04B 28/082; C04B 28/14; C04B 7/21; C04B 7/17; C04B 2111/00112; C04B 28/06; C04B 28/065; C04B 28/16; C04B 2111/00637; C04B 40/0039; Y02P 40/10; Y02W 30/91
See application file for complete search history.

(56) References Cited

U.S. PATENT DOCUMENTS

| | | | |
|---|---|---|---|
| 7,288,147 B2 | 10/2007 | Christensen et al. | |
| 2012/0216721 A1* | 8/2012 | Hesselbarth | C04B 7/1535 |
| | | | 106/695 |
| 2018/0072623 A1 | 3/2018 | Blaum et al. | |

FOREIGN PATENT DOCUMENTS

| | | | | |
|---|---|---|---|---|
| CN | 107428612 A | 12/2017 | | |
| EP | 2502891 A1 | 9/2012 | | |
| JP | 2016003152 A | * 1/2016 | ............. | C04B 22/10 |
| WO | 90/03346 A1 | 4/1990 | | |
| WO | 2011/055063 A1 | 5/2011 | | |
| WO | 2016/053290 A1 | 4/2016 | | |
| WO | WO-2017198930 A1 | * 11/2017 | ........... | C04B 28/082 |
| WO | WO-2021023366 A1 | * 2/2021 | ............. | C04B 28/14 |

OTHER PUBLICATIONS

JP_2016003152_A_Machine_Translation (Year: 2016).*
WO-2017198930-A1_Machine Translation (Year: 2017).*
WO 2021023366 A1_Machine Translation (Year: 2021).*
Yousheng, Tao. "Production of Autoclaved Aerated Concrete Blocks." Beijing: China Building Materials Industry Publishing House. pp. 112. Nov. 30, 2018.
Jun. 4, 2021 International Search Report issued in International Patent Application No. PCT/EP2021/055660.
Jun. 4, 2021 Written Opinion issued in International Patent Application No. PCT/EP2021/055660.
Sep. 6, 2022 International Preliminary Report on Patentability issued in International Patent Application No. PCT/EP2021/055660.

* cited by examiner

*Primary Examiner* — Amber R Orlando
*Assistant Examiner* — Anastasia A. Kuvayskaya
(74) *Attorney, Agent, or Firm* — Oliff PLC

(57) ABSTRACT

A hydraulic binder including (in % by dry weight); A. at least 50 of at least one ground and granulated blast-furnace slag; B. more than 5 of at least one calcium aluminate cement and/or of at least one calcium sulfoaluminate cement; C. more than 5 of at least one source of sulfate ions; D. between 1 and 5 of $Ca(OH)_2$ and/or Portland cement; E. between 0.01 and 1 of at least one alkali metal carbonate; F. and at least one alkalifying reagent consisting of at least one alkali metal carbonate and/or bicarbonate, different from E; under the following conditions: (i) amount of C allows sulfate ions of C to react with B and A; (ii) the amount of F sufficiently causes a reaction with D in water resulting in a wet formulation with a pH not less than 12, for a water-to-mortar mixing rate between 10 and 35% by weight.

6 Claims, No Drawings

SLAG-BASED HYDRAULIC BINDER, DRY MORTAR COMPOSITION COMPRISING SAME AND SYSTEM FOR ACTIVATING A SLAG-BASED BINDER

FIELD OF THE INVENTION

The invention lies within the field of powder compositions which comprise binders based on slag and are intended for the preparation of wet formulations for construction, for example, of mortars, more particularly of adhesive mortars.

The invention relates more particularly to a slag-based hydraulic binder, in particular for mortars, more particularly for adhesive mortars.

A further subject of the invention is a dry mortar composition comprising such a binder, and also an activating system for said binder.

The wet formulation obtained by mixing this dry composition with water is likewise embraced by this invention, as is the mixing itself, and also the hardened product produced from this wet formulation.

TECHNOLOGICAL BACKGROUND OF THE INVENTION

Conventional hydraulic binders, particularly for mortars, consist of Portland cements, which have a $CO_2$ footprint of approximately 870 kg per tonne.

Replacing the Portland cement (CEM I) in these hydraulic binders is a current environmental issue.

To accomplish this, it is known practice to employ the following products as CEM I substitutes: ground granulated blast-furnace slags, pozzolanic materials (natural pozzolans, calcined natural pozzolans, synthetic pozzolans), fly ashes (silica and calcium fly ashes), calcined schists, limestones, silica fumes.

The ground granulated blast-furnace slags have hydraulic and pozzolanic properties, but require activation by addition of lime, soda or gypsum. The setting and/or hardening of the slag is said to be subject to sodium, calcium and sulfate activation.

Alkaline activation of this kind inevitably involves the presence of substantial amounts of strong bases, thereby making it dangerous to handle the mortar compositions containing them, and dictating "Xi" labelling.

In order to overcome this hurdle, the construction material binders according to PCT application WO 2011/055063A1 are binders which are based on ground granulated blast-furnace slag and in which the concentrations of alkalis are reduced. For instance, this PCT application discloses an adhesive mortar composition as follows:

| Adhesive binder for tiling with sand | | Amount as a percentage of the total weight of dry composition | Total |
|---|---|---|---|
| CaSO$_4$ | % | 1.5 | |
| Fly ashes | % | 5.0 | |
| slag (4000 Blaine) | % | 35.0 | |
| slag (7500 Blaine) | % | 4.5 | |
| Silica sand | % | 49.0 | |
| Portland cement 52.5 | % | 1.0 | |
| Polymer powder (ethylene-vinyl acetate copolymer) | % | 3.4 | |

-continued

| Adhesive binder for tiling with sand | | Amount as a percentage of the total weight of dry composition | Total |
|---|---|---|---|
| Cellulose ether | % | 0.4 | |
| Alkali metal sulfate | % | 0.10 | |
| Alkali metal carbonate | % | 0.10 | 100.0 |

The Portland cement may be replaced or combined with a sulfoaluminate cement. The alkali metal sulfate may be a lithium, sodium or potassium sulfate. The alkali metal carbonate may be a lithium, sodium or potassium carbonate.

In the same vein, international PCT application WO 2017/198930A1 describes a tiling adhesive formulation in the major constituent and a ground granulated blast-furnace slag with an accelerating system comprising ultra-fine particles of magnesium and calcium carbonate. This tiling adhesive has the following composition in particular:

| Component | Percentage by weight |
|---|---|
| Silica sand | 53.5 |
| Slag (4000 Blaine) | 35.0 |
| Particles of calcium and magnesium carbonates (BET surface area of 4 m$^2$/g and D$_{50}$ of 2.5 μm) | 5.0 |
| Polymer powder (ethylene-vinyl acetate copolymer) | 3.4 |
| CaSO$_4$ | 1.5 |
| Portland cement 52.5 | 1.0 |
| Cellulose ether | 0.4 |
| Alkali metal sulfate | 0.1 |
| Alkali metal carbonate | 0.1 |

The Portland cement may be replaced or combined with a sulfoaluminate cement, a high-alumina cement, a belitic cement and/or a pozzolanic mixture cement. The alkali metal sulfate may be a lithium, sodium or potassium sulfate. The alkali metal carbonate may be a lithium, sodium or potassium carbonate.

The properties of the mortars in the eventual applications are of course at the heart of the evaluation of the quality of the binder, of its activating system and of the dry composition of mortar in its entirety.

For adhesive mortars, the reference is the standard NF EN 12 004-1 (April 2017). The tensile adhesion under different conditions, for example after an extended open time of 30 minutes, is a key quality criterion.

The adhesive mortars according to WO 2011/055063 and WO 2017/198930 have performance properties which can be improved on, particularly as regards the tensile adhesion with an extended open time of at least 30 minutes, and return-to-service times. This performance is decisive in terms of the commercial attractiveness of the tiling adhesive.

European patent application EP2502891A1 describes an activator for latent pozzolanic and/or hydraulic binders, comprising: A) 5-50% of NaOH; B) 10-90% of CaSO$_4$·0.5H$_2$O (optionally Na$_2$SO$_4$); Ca(NO$_3$)$_2$-4H$_2$O; D) optionally a CaCO$_3$-based filler. This activator is incorporated into a binder at a level of 4% by weight. This binder may comprise 60% of blast-furnace slag and 40% of cement, or 40% of cement, 30% of slag and 30% of silicious filler. This European patent application does not describe adhesive mortar, screeds or renders having improved performance properties with regard, in particular, to adhesion and to return-to-service times.

Objectives of the Invention

In this context, the invention aims to satisfy at least one of the following objectives:

to provide a hydraulic binder, particularly for mortars, more particularly for adhesive mortars, for screeds or for renders, for repair mortars, sealing or grouting mortars, or high-performance mortars, intended for aggressive environments such as sulfate-containing waters, de-icing salts, and based on ground granulated blast-furnace slag, intended for the preparation of a composition which is devoid or virtually devoid of Portland CEM cement (binder having an OPC content, for example of not more than 30% by dry weight), which enables setting and hardening with an initial mechanical strength which is improved relative to the known binders based on ground and granulated blast-furnace slag;

to provide a hydraulic binder, in particular for mortars, more particularly for adhesive mortars, for screeds or for renders, which is based on ground granulated blast-furnace slag, is free or virtually free from Portland CEM cement (binder having, for example, an OPC content of not more than 30% by dry weight), which enables setting and hardening with an initial mechanical strength which is improved relative to the known binders based on ground and granulated blast-furnace slag;

to provide a dry mortar composition, more particularly an adhesive mortar, based on ground granulated blast-furnace slag, which is free or virtually free from Portland CEM cement (binder having, for example, an OPC content of not more than 5% by dry weight) and which, when mixed with water, conforms to standard NF EN 12 004-1 (April 2017);

to provide a dry mortar composition, more particularly an adhesive mortar, based on ground granulated blast-furnace slag, which is free or virtually free from Portland CEM cement (binder having, for example, an OPC content of not more than 5% by dry weight) which, when mixed with water, conforms to standard NF EN 12 004-1 (April 2017) and which has a tensile adhesion under different conditions, for example after an extended open time of 30 minutes, which is substantially improved relative to that obtained for the adhesive mortars according to WO 2011/055063 and WO 2017/198930 (for >0.8 N/mm²);

to provide a dry mortar composition, more particularly an adhesive mortar, a screed or render, based on ground granulated blast-furnace slag, which is free or virtually free from Portland CEM cement (binder having, for example, an OPC content of not more than 5% by dry weight) which can be packaged in ready-to-use dry mortar form in bags without Xi labelling in accordance with Regulation (EC) 1907/2006-REACH;

to provide a dry mortar composition, more particularly an adhesive mortar, based on ground granulated blast-furnace slag, which is free or virtually free from Portland CEM cement (binder having, for example, an OPC content of not more than 5% by dry weight) which, when mixed with water, conforms to standard NF EN 12 004-1 (April 2017) and which has an open time of between 20 and 30 min at least and/or a setting time of between 30 minutes and 6 hours, and/or a return-to-service time of between 4 and 24 hours, for mixing rates (water*100/binder) of between 20 and 30%;

to provide a dry mortar composition, more particularly an adhesive mortar, a screed or render, based on ground granulated blast-furnace slag, which is free or virtually free from Portland CEM cement (binder having, for example, an OPC content of not more than 5% by dry weight) which satisfies at least one of the objectives above and which is economical and eco-friendly;

to provide an activating system for a hydraulic binder for mortars, more particularly for adhesive mortars, for screeds or for renders, which enables some or all of the objectives set out above to be met;

to provide a wet formulation, obtained by mixing the dry mortar composition that is the subject of the objectives above with water, said wet formulation having a rheology suitable for its easy use and having at least one of the aforementioned properties for the hardening or hardened products that are obtained on the basis of this wet formulation;

to provide processes for preparing the dry composition and the wet formulation that are easy to implement and are economical;

to provide hardened products (prefabricated or otherwise) for construction, obtained on the basis of the wet formulation set out in the abovementioned objectives (paste-grout-coating-mortar-concrete-adhesive mortar-screeds-renders-concrete block-sandwich panel) which are economical and have good long-term mechanical properties (hardness, flexural/compressive strength, durability, cohesion) and good service performance properties (limited shrinkage in particular).

BRIEF DESCRIPTION OF THE INVENTION

The invention meets at least one of the above objectives, and relates, according to a first aspect, to a hydraulic binder, in particular for mortars, more particularly for adhesive mortars, comprising (in % by dry weight):

A. at least 50 of at least one ground and granulated blast-furnace slag;

B. more than 5, preferably from 5.5 to 30, and, more preferably still, from 6 to 20, of at least one calcium aluminate cement and/or of at least one calcium sulfoaluminate cement;

C. more than 5, preferably from 6 to 30, and, more preferably still, from 8 to 20, of at least one source of sulfate ions;

D. between 1 and 5 of $Ca(OH)_2$ and/or of Portland cement;

E. between 0.01 and 1 of at least one alkali metal carbonate, preferably $Li_2CO_3$;

F. and at least one alkalifying reagent consisting of at least one alkali metal carbonate and/or bicarbonate, different from E, preferably selected from the group comprising—or better still consisting of—: $NaHCO_3$; $Na_2CO_3$; $K_2CO_3$; and mixtures thereof;

subject to the following conditions:

(i) the amount of C is sufficient to allow the sulfate ions of C to react with B and with A;

(ii) the amount of F is sufficient so that its reaction with component D in the presence of water brings the pH of the resulting wet formulation to a value of not less than 12, preferably than 13, for a water-to-mortar mixing rate of between 10 and 35% by weight.

This slag-rich binder composition is a notable alternative to the CEM I-based binders in terms of a substantial reduction in the carbon footprint (mass of $CO_2$ equivalent per tonne). Fine-tuning the concentrations of the components ABCDEF optimizes the hydration and the dissolution under alkaline conditions (pH>12) of the slag A. This promotes sodium and sulfate activation of the setting of the hardening of the wet formulation, obtained by mixing a dry composition comprising the binder according to the invention with water. The hardened or hardening products obtained from this wet formulation therefore benefit from an improved early mechanical strength. They were also all of the requirements, particularly standardized requirements, of the end-use applications for which the dry compositions are intended, particularly for mortar and more particularly for adhesive mortar (EN NF 12004 April 2017), comprising the binder according to the invention.

In one preferred characteristic of the invention, the ratio of the concentrations of component [C] and of component [B] is defined as follows:

$0.1<[C]/[A]$; preferably $0.1\le[C]/[A]\le1$, and, more preferably still, $0.1\le[C]/[A]\le0.3$.

$0.5<[C]/[B]$; preferably $[C]/[B]\le3$, and, more preferably still, $1\le[C]/[B]\le2$.

According to one embodiment, the hydraulic binder according to the invention comprises:

A. 55 to 90, preferably 60 to 85, of at least one ground and granulated blast-furnace slag;

B. 5.5 to 30, preferably 6 to 20, of at least one calcium aluminate cement and/or of at least one calcium sulfoaluminate cement;

C. 6 to 30, preferably from 8 to 20, of at least one source of sulfate ions;

D. 1 to 5, preferably 2 to 4, of $Ca(OH)_2$ and/or of Portland cement;

E. 0.01 to 1, preferably 0.1 to 0.5, of $Li_2CO_3$;

F. and at least one alkalifying reagent consisting of at least one alkali metal carbonate and/or bicarbonate, different from E, preferably selected from the group comprising—or better still consisting of—: $NaHCO_3$; $Na_2CO_3$; $K_2CO_3$; and mixtures thereof, with $NaHCO_3$ being preferred; G. 0 to 10, preferably from 0 to 20, of at least one binder different from A, B and D, preferably selected from the group comprising—or better still consisting of—: silica or silica-alumina binders, fly ashes, advantageously silica-alumina fly ashes, silica-calcium-alumina fly ashes, expanded or calcined clay dusts and/or metakaolins.

According to a second of its aspects, the invention therefore relates to a dry mortar composition comprising the binder according to the invention.

Advantageously, the invention is directed to a dry adhesive mortar composition comprising (in % by dry weight):

A. 10 to 50, preferably 15 to 40, of at least one ground and granulated blast-furnace slag;

B. 0.5 to 20, preferably 1 to 15, of at least one calcium aluminate cement and/or of at least one calcium sulfoaluminate cement;

C. 1 to 30, preferably from 2 to 20, of at least one source of sulfate ions with $1\le[C]/[B]\le2$;

D. 0.05 to 5, preferably 0.5 to 2, of $Ca(OH)_2$ and/or of Portland cement;

E. 0.02 to 0.8, preferably 0.05 to 0.3, of $Li_2CO_3$;

F. and at least one alkalifying reagent consisting of at least one alkali metal carbonate and/or bicarbonate, different from E, preferably selected from the group comprising—or better still consisting of—: $NaHCO_3$; $Na_2CO_3$; $K_2CO_3$; and mixtures thereof, with $NaHCO_3$ being preferred;

G. 30 to 80, preferably from 40 to 70, of at least one type of aggregates preferably selected from the group comprising—or better still consisting of—: mineral sands such as silica sands, lime sands and silica-lime sands, light mineral sands such as perlite, vermiculite, expanded glass beads, sands obtained from the recycling of mineral materials such as demolition concrete, ground glass, sands obtained from the recycling of organic materials such as ground tyres, ground polyurethanes, and mixtures thereof;

H. 1 to 10, preferably 1 to 5, of at least one redispersible polymer;

I. 0.01 to 5, preferably 0.05 to 1, of at least one thickener;

J. 0.01 to 0.5, preferably 0.05 to 0.3, of at least one retarder, preferably selected from the group comprising—or better still consisting of—: tartaric acid and its salts, citric acid and its salts, gluconic acid and its salts, and mixtures thereof.

According to another embodiment, the invention is directed to an adhesive mortar composition comprising (in % by dry weight):

A. 10 to 50, preferably 15 to 40, of at least one ground and granulated blast-furnace slag;

B. 0.5 to 20, preferably 1 to 15, of at least one calcium aluminate cement and/or of at least one calcium sulfoaluminate cement;

C. 1 to 20, preferably from 2 to 15, of at least one source of sulfate ions with $0.5\le[C]/[B]\le3$;

D. 0.05 to 5, preferably 0.5 to 2, of $Ca(OH)_2$ and/or of Portland cement;

E. 0.02 to 0.8, preferably 0.05 to 0.15, of $Li_2CO_3$;

F. and at least one alkalifying reagent consisting of at least one alkali metal carbonate and/or bicarbonate, different from E, preferably selected from the group comprising—or better still consisting of—: $NaHCO_3$; $Na_2CO_3$; $K_2CO_3$; and mixtures thereof, with $NaHCO_3$ being preferred;

G. 30 to 80, preferably from 40 to 70, of at least one type of aggregates preferably selected from the group comprising—or better still consisting of—: mineral sands such as silica sands, lime sands and silica-lime sands, light mineral sands such as perlite, vermiculite, expanded glass beads, sands obtained from the recycling of mineral materials such as demolition concrete, ground glass, sands obtained from the recycling of organic materials such as ground tyres, ground polyurethanes, and mixtures thereof;

H. 1 to 10, preferably 1 to 5, of at least one redispersible polymer;

I. 0.01 to 5, preferably 0.05 to 1, of at least one thickener;

J. 0.01 to 0.5, preferably 0.05 to 0.3, of at least one retarder, preferably selected from the group comprising—or better still consisting of—: tartaric acid and its salts, citric acid and its salts, gluconic acid and its salts, and mixtures thereof.

This adhesive mortar composition is eco-friendly and highly performing. It meets the requirements of standard EN NF 12004 April 2017 on tiling adhesives. It is a ready-to-use dry mortar composition which can be packaged in bags without $X_i$ labelling for alkaline corrosive risk. Furthermore, the sulfo-alkaline activation of the slag A is made possible with a pH of more than 12 during mixing with water according to a water/mortar mixing rate of between 15 and 30%, for example 25%. This adhesive mortar sets rapidly: the adhesion>0.5 $N/mm^2$ at 6 hours or at 24 hours. It is also noteworthy that the concentration I of redispersible polymer in this adhesive mortar according to the invention remains limited, this being beneficial to the economy of the composition.

A further subject of the invention is an improved dry adhesive mortar composition with rapid hardening, C2F, which when mixed with water meets the standard NF EN 12004 April 2017, comprising (in % by dry weight):

A. 10 to 35, preferably 20 to 30, of at least one ground and granulated blast-furnace slag;

B. 2 to 12, preferably 5 to 9, of at least one calcium aluminate cement and/or of at least one calcium sulfoaluminate cement;

C. 2 to 12, preferably from 5 to 9, of at least one source of sulfate ions with $0.5 \leq [C]/[B] \leq 3$;

D. 0.05 to 5, preferably 0.5 to 2, of $Ca(OH)_2$ and/or of Portland cement;

E. 0.02 to 0.8, preferably 0.05 to 0.15, of $Li_2CO_3$;

F. and at least one alkalifying reagent consisting of at least one alkali metal carbonate and/or bicarbonate, different from E, preferably selected from the group comprising—or better still consisting of—: $NaHCO_3$; $Na_2CO_3$; $K_2CO_3$; and mixtures thereof, with $NaHCO_3$ being preferred;

G. 50 to 70, preferably from 52 to 60, of at least one type of aggregates, preferably selected from sands and mixtures thereof;

H. 1 to 5, preferably 1 to 4, of at least one redispersible polymer powder;

I. 0.05 to 2, preferably 0.1 to 0.5, of at least one thickener;

J. 0.05 to 1, preferably 0.1 to 0.5, of at least retarder, preferably selected from the group comprising—or better still consisting of—: tartaric acid and its salts, citric acid and its salts, gluconic acid and its salts, and mixtures thereof.

A further subject of the invention is an improved dry adhesive mortar composition which is deformable, C2S1, which when mixed with water conforms to the standard NF EN 12004 April 2017, comprising (in % by dry weight):

A. 10 to 30, preferably 20 to 25, of at least one ground and granulated blast-furnace slag;

B. 1 to 7, preferably 1 to 5, of at least one calcium aluminate cement and/or of at least one calcium sulfoaluminate cement;

C. 1 to 10, preferably from 2 to 9, of at least one source of sulfate ions with $0.5 \leq [C]/[B] \leq 3$;

D. 0.05 to 5, preferably 0.5 to 2, of $Ca(OH)_2$ and/or of Portland cement;

E. 0.02 to 0.8, preferably 0.05 to 0.15, of $Li_2CO_3$;

F. and a percentage of more than 1 and not more than 4, preferably than 3, of at least one alkalifying reagent consisting of at least one alkali metal carbonate and/or bicarbonate, different from E, preferably selected from the group comprising—or better still consisting of—: $NaHCO_3$; $Na_2CO_3$; $K_2CO_3$; and mixtures thereof, with $NaHCO_3$ being preferred;

G. 60 to 90, preferably from 62 to 70, of at least one type of aggregates preferably selected from the group comprising—or better still consisting of—: mineral sands such as silica sands, lime sands and silica-lime sands, light mineral sands such as perlite, vermiculite, expanded glass beads, sands obtained from the recycling of mineral materials such as demolition concrete, ground glass, sands obtained from the recycling of organic materials such as ground tyres, ground polyurethanes, and mixtures thereof;

H. 1 to 5, preferably 1 to 4, of at least one redispersible polymer powder;

I. 0.05 to 2, preferably 0.1 to 0.5, of at least one thickener;

J. 0.05 to 1, preferably 0.1 to 0.5, of at least one retarder, preferably selected from the group comprising—or better still consisting of—: tartaric acid and its salts, citric acid and its salts, gluconic acid and its salts, and mixtures thereof.

A further subject of the invention is an improved dry adhesive mortar composition which is highly deformable, C2S2, which when mixed with water conforms to the standard NF EN 12004 April 2017, comprising (in % by dry weight):

A. 15 to 40, preferably 25 to 35, of at least one ground and granulated blast-furnace slag;

B. 1 to 7, preferably 1 to 5, of at least one calcium aluminate cement and/or of at least one calcium sulfoaluminate cement;

C. 1 to 10, preferably from 2 to 9, of at least one source of sulfate ions with $0.5 \leq [C]/[B] \leq 3$;

D. 0.05 to 5, preferably 0.5 to 2, of $Ca(OH)_2$ and/or of Portland cement;

E. 0.02 to 0.8, preferably 0.05 to 0.15, of $Li_2CO_3$;

F. and at least one alkalifying reagent consisting of at least one alkali metal carbonate and/or bicarbonate, different from E, preferably selected from the group comprising—or better still consisting of—: $NaHCO_3$; $Na_2CO_3$; $K_2CO_3$; and mixtures thereof, with $NaHCO_3$ being preferred;

G. 50 to 70, preferably from 52 to 62, of at least one type of aggregates, preferably selected from sands and mixtures thereof;

H. 1 to 10, preferably 2 to 8, of at least one redispersible polymer powder;

I. 0.05 to 2, preferably 0.1 to 0.5, of at least one thickener;

J. 0.05 to 1, preferably 0.08 to 0.15, of at least retarder, preferably selected from the group comprising—or better still consisting of—: tartaric acid and its salts, citric acid and its salts, gluconic acid and its salts, and mixtures thereof.

The dry mortar composition according to the invention may also be a screed composition or a render composition. This composition may comprise (in % by dry weight):

A. 3 to 50, preferably 4 to 30, of at least one ground and granulated blast-furnace slag;

B. 0.5 to 20, preferably 1 to 15, of at least one calcium aluminate cement and/or of at least one calcium sulfoaluminate cement;

C. 1 to 20, preferably from 2 to 15, of at least one source of sulfate ions with $0.5 \leq [C]/[B] \leq 3$;

D. 0.05 to 5, preferably 0.5 to 2, of $Ca(OH)_2$ and/or of Portland cement;

E. 0.02 to 0.8, preferably 0.05 to 0.15, of $Li_2CO_3$;

F. and at least one alkalifying reagent consisting of at least one alkali metal carbonate and/or bicarbonate, different from E, preferably selected from the group comprising—or better still consisting of—: $NaHCO_3$; $Na_2CO_3$; $K_2CO_3$; and mixtures thereof, with $NaHCO_3$ being preferred;

G. 30 to 80, preferably from 40 to 70, of at least one type of aggregates preferably selected from the group comprising—or better still consisting of—: mineral sands such as silica sands, lime sands and silica-lime sands, light mineral sands such as perlite, vermiculite, expanded glass beads, sands obtained from the recycling of mineral materials such as demolition concrete, ground glass, sands obtained from the recycling of organic materials such as ground tyres, ground polyurethanes, and mixtures thereof;

H. 1 to 10, preferably 1 to 5, of at least one redispersible polymer;

I. 0.01 to 5, preferably 0.05 to 1, of at least one thickener;

J. 0.01 to 0.5, preferably 0.05 to 0.3, of at least one retarder, preferably selected from the group comprising—or better still consisting of—: tartaric acid and its salts, citric acid and its salts, gluconic acid and its salts, and mixtures thereof.

The invention further relates to an improvement to dry mortars, more particularly to adhesive mortars, screeds and renders, said improvement comprising the use of the binder and/or the activating system according to the invention in a dry mortar composition or a wet mortar formulation, more particularly an adhesive mortar, render or screed composition or formulation. The dry mortar composition according to the invention may advantageously include one or more additives selected from the group comprising—ideally consisting of—: water retainers, fillers, light fillers, water repellents, dyes/pigments, fibres, antifoams, plasticizers, air entrainers or foam-formers, in situ gas generators, flame retardants, biocides, dispersants, and mixtures thereof.

According to another of its aspects, the invention relates to an activating system for a hydraulic binder for mortars, more particularly for adhesive mortars, comprising (in % by dry weight):

C. 60 to 93, preferably 70 to 90, of at least one source of sulfate ions;

D. 5 to 25, preferably 8 to 20, of $Ca(OH)_2$ and/or of Portland cement;

E. 1 to 3 of $Li_2CO_3$;

F. 1 to 15, preferably 2 to 10, of at least one alkali metal carbonate and/or bicarbonate, different from E, preferably selected from the group comprising—or better still consisting of—: $NaHCO_3$; $Na_2CO_3$; $K_2CO_3$ and mixtures thereof.

This binder further comprises (in % by dry weight):

A. 50 to 99, preferably 60 to 95, of at least one ground and granulated blast-furnace slag;

B. 40 to 1, preferably from 30 to 5, and, more preferably still, from 6 to 20, of at least one calcium aluminate cement and/or at least one calcium sulfoaluminate cement.

According to another embodiment, the invention relates to an activating system for a hydraulic binder for mortars, more particularly for adhesive mortars, renders or screeds, characterized in that it comprises (in % by dry weight):

C. 60 to 93, preferably 70 to 90, of at least one source of sulfate ions;

D. 5 to 25, preferably 8 to 20, of $Ca(OH)_2$ and/or of Portland cement;

E. 0.5 to 5, preferably 1 to 3, of $Li_2CO_3$;

F. at least one alkali metal carbonate and/or bicarbonate, different from E, preferably selected from the group comprising—or better still consisting of—: $NaHCO_3$; $Na_2CO_3$; $K_2CO_3$ and mixtures thereof;

and in that the binder comprises (in % by dry weight):

A. 60 to 99, preferably 70 to 95, of at least one ground and granulated blast-furnace slag;

B. 40 to 1, preferably from 30 to 5, and, more preferably still, from 6 to 20, of at least one calcium aluminate cement and/or at least one calcium sulfoaluminate cement.

According to another of its aspects, the invention relates to a process for preparing the binder or the dry composition according to the invention. This process essentially comprises mixing the components of said composition, these components being taken separately and/or in the form of one or more partial or complete mixtures.

The invention, in another of its aspects, is directed to a wet mortar formulation comprising a dry composition according to the invention that is mixed with water, according to a water/mortar mixing rate of between 10 and 35%, preferably between 15 and 30%.

More particularly, the wet formulation according to the invention possesses good application performance qualities such as "workability" or rheological properties suitable for pumping. Moreover, this render exhibits, in particular, good mechanical performance properties.

The invention also relates to a process for preparing a wet mortar formulation, which comprises mixing the components of the dry composition according to the invention with mixing water, advantageously according to a water/mortar mixing rate of between 10 and 35%, preferably between 15 and 30%, said components being taken separately and/or in the form of one or more partial or complete mixtures.

Lastly, the invention is also directed to the use of an activating system comprising (in % by dry weight):

C. 60 to 93, preferably 70 to 90, of at least one source of sulfate ions;

D. 5 to 25, preferably 8 to 20, of $Ca(OH)_2$ and/or of Portland cement;

E. 0.5 to 5, preferably 1 to 3, of $Li_2CO_3$;

F. 1 to 15, preferably 2 to 10, of at least one alkali metal carbonate and/or bicarbonate, different from E, preferably selected from the group comprising—or better still consisting of—: $NaHCO_3$; $Na_2CO_3$; $K_2CO_3$ and mixtures thereof of a hydraulic binder;

for activating a hydraulic binder for mortars, in particular for adhesive mortars, said binder comprising (in % by dry weight):

A. 50 to 99, preferably 60 to 95, of at least one ground and granulated blast-furnace slag;

B. 40 to 1, preferably from 30 to 5, and, more preferably still, from 6 to 20, of at least one calcium aluminate cement and/or at least one calcium sulfoaluminate cement;

wherein C is employed in an amount sufficient to allow the sulfate ions of C to react with B and with A.

According to another embodiment, the invention relates to the use of an activating system comprising (in % by dry weight):

C. 60 to 95, preferably 70 to 90, of at least one source of sulfate ions;

D. 5 to 25, preferably 8 to 20, of $Ca(OH)_2$ and/or of Portland cement;

E. 0.5 to 5, preferably 1 to 3, of $Li_2CO_3$;

F. and at least one alkali metal carbonate and/or bicarbonate, different from E, preferably selected from the group comprising—or better still consisting of—: $NaHCO_3$; $Na_2CO_3$; $K_2CO_3$ and mixtures thereof of a hydraulic binder;

for activating a hydraulic binder for mortars, in particular for adhesive mortars, said binder comprising (in % by dry weight):

A. 60 to 99, preferably 70 to 95, of at least one ground and granulated blast-furnace slag;

B. 40 to 1, preferably from 30 to 5, and, more preferably still, from 6 to 20, of at least one calcium aluminate cement and/or at least one calcium sulfoaluminate cement;

wherein C is employed in an amount sufficient to allow the sulfate ions of C to react with B and with A.

Definitions

Throughout the present specification, any singular denotes a singular or a plural interchangeably. The definitions given below as examples may be used to interpret the present specification:

"polymer" denotes "homopolymer" and "copolymer" interchangeably;

"mortar" denotes a dry or wet or hardened mixture of one or more organic and/or inorganic binders, of aggregates with a diameter<5 mm (sands—aggregates) and optionally of fillers and/or additives and/or adjuvants;

"dry" qualifies a mortar or a concrete in pulverulent form, before mixing with an appropriate liquid, preferably water; a dry mortar or a dry concrete is also a ready-to-use mortar or concrete, this being one which is ready to be mixed with a mixing liquid in order to form a wet formulation which is intended for use, before hardening, in construction material applications;

"render" denotes more specifically a mortar which is used as a surface coating on a surface in order to provide it with protection, homogenization, decoration, etc.;

"screed" denotes more specifically a mortar which is used as a homogeneous sealing system of a certain thickness (standard NF EN 13 300 18—August 2000);

"adhesive mortar" or "adhesive" denotes a dry, wet or hardened composition which is used to adhere tiling to a substrate;

"paste" denotes a wet composition containing water;

"filler" is a filler having a bulk density of more than 0.75;

"light filler" is a filler having a bulk density of not more than 0.75;

"liquid": dispersion, emulsion or solution on an aqueous basis.

DETAILED DESCRIPTION OF THE INVENTION

Binder ABCDEF

The inventors have succeeded in developing an eco-friendly binder ABCDEF which is based on ground and granulated blast-furnace slag and which enables the formulation of dry compositions, particularly mortar compositions and more particularly adhesive mortar compositions, which lead, after hardening (mixing with water), to hardened products which are adherent or mechanically strong and which meet the specifications expected in the end-use applications of building products, more particularly of adhesive mortars according to standard EN NF 12004 April 2017.

The Ground and Granulated Blast-Furnace Slag A

This is preferably a ground and dried, granulated blast-furnace slag having an average glass content of more than 90% (measurement by X-ray diffraction). This slag conforms to European standard NF EN 15167-1 of 1 Sep. 2006.

This slag is advantageously a C.E. ground granulated blast-furnace slag produced at Fos-sur-Mer by ECOCEM® and having the following characteristics:

Chemical Composition (Average Percentage)

| $SiO_2$ | $Al_2O_3$ | $Fe_2O_3$ | CaO | MgO | $TiO_2$ | $SO_3$ | $Cl^-$ | $S^{2-}$ | $Na_2O$ | $K_2O$ | $Na_2O_{eqv.}$ |
|---|---|---|---|---|---|---|---|---|---|---|---|
| 37.3 | 10.7 | 0.2 | 43.0 | 6.5 | 0.7 | 0.1 | 0.01 | 0.8 | 0.23 | 0.35 | 0.45 |

Chemical modulus (CaO + MgO)/SiO2: > 1.25 (≥ 1.2: class A to NF EN 206-1/CN)

Chemical modulus (CaO+MgO)/SiO2: >1.25 (≥1.2: class A to NF EN 206-1/CN)

Chemical Characteristics (Representative, Indicative Values)

| Formulation | | | | | | | | Initial |
|---|---|---|---|---|---|---|---|---|
| Reference | | Compressive strengths | | | ACTIVITY INDEX | | | setting |
| Ecocem | cement | 7 d | 28 d | 90 d | 7 d | 28 d | 90 d | time (min) |
| 0% | 100% | 43 | 55 | 64 | | — | | 170 |
| 50% | 50% | 31 | 55 | 55 | 72% | 100% | 103% | 210 |
| Limits of the product standard NF EN 15167-1 | | | | | ≥45% | ≥70% | | <2× cement setting time |
| Class A limits acc. to standard NF EN 206/CN | | | | | ≥65% | ≥80% | | |

Other Characteristics

| | |
|---|---|
| Blame specific surface area | 4 450 ± 250 cm²/g |
| | ≥2 750 cm²/g: NF EN 15167-9 |
| | ≥4 200 cm²/g: class A acc. to NF EN 206/CN |
| Indicative median diameter (d50) | 11 μm |
| Undersize at 32 μm | ≥9.5% |
| Density | 2.90 ± 0.03 cm³ |
| Bulk density | 0.8 ± 0.1 cm³ |
| Index [CIE L*a*b*] with CR410 | L* × 89.9 ± 2 |
| Loss on ignition (950° C.) | <1.5% |
| Moisture constant (100° C.) | <0.5% |

Any other ground and granulated blast-furnace slag having the features above with a range of variation of +/−10% is an appropriate slag A for forming part of the composition of the binder according to the invention.

According to one notable mode of the invention, at least a portion of the slag A has a Blaine specific surface area of between 3000 and 5000 cm²/g, preferably between 4200 and 4700 cm²/g, and, optionally, at least one other portion of slag A has a Blaine specific surface area of more than 5000 and not more than 20 000 cm²/g, preferably between 6500 and 8500 cm²/g.

Calcium Aluminate and/or Sulfoaluminate Cement B and/or Binder

Cements based on calcium aluminate (CAC) or high-alumina cements result from the fusing of a mixture of limestone and bauxite, followed by milling without gypsum to a fineness comparable with that of Portland cements. The minimum strengths guaranteed in "standard mortar" are as follows: compressive strength in N/mm² at 6 hours: ≥18; at 24 hours: ≥40. These cements are defined by standard EN14647.

The cement based on calcium sulfoaluminate (CSA) may be an alitic sulfoaluminate cement, a ye'elimitic cement and/or belitic cement and/or a binder having a high cement-phase content and being rich in alumina: (for example $Al_2O_3>30\%$)

Sulfate Ion Source C

The source C of sulfate ions is selected from the group comprising—or better still consisting of—: natural or synthetic gypsum, calcium sulfate hemihydrate, bassanite, anhydrite, selenite, alabaster, fibrous gypsum, saccharoidal gypsum, marine gypsum, gypsum flower, phosphogypsum (gypsum from phosphoric acid manufacture), desulfurization gypsum, titanogypsum (gypsum from the neutralization of the sulfuric acid produced in the process synthesizing titanium dioxide), citrogypsum (gypsum from citric acid manufacture), tartarogypsum (gypsum from tartaric acid manufacture), borogypsum (gypsum from boric acid manufacture), lactogypsum (gypsum from lactic acid manufacture), and mixtures thereof.

The amount of C is sufficient to allow the sulfate ions of C to react with B and with A; in other words, there remains sufficient sulfate C to activate the slag A when all of the high-alumina cement or sulfoaluminate cement B has been consumed. Accordingly, the mass ratios C/A and C/B are, for example, as follows:

$$0.1 \leq [C]/[A] \leq 1$$

$$0.5 \leq [C]/[B] \leq 3$$

The following reactions takes place, for example when B is a calcium aluminate cement:

$$C_5S_3A + 2C\bar{S} + \frac{76}{3}H \rightarrow 3CSH + \frac{2}{3}C_6A\bar{S}_3H_{32} + \frac{1}{3}AH_3$$

Component D: $Ca(OH)_2$ and/or Portland Cement CEM

Lime $ca(OH)_2$: This may be provided by quicklime, slaked lime, air lime, or hydraulic lime.

$ca(OH)_2$ is preferably selected from the group comprising—ideally consisting of—the following limes: CL 90, DL 85, CL 80, DL 80, CL 70, DL 70, HL 2, HL 3.5, HL 5, NHL 2, NHL 3.5, NHL 5, NHL-Z, and mixtures thereof It may for example be Chaubat CL90 air lime from Bonargent-Goyon; white hydraulic lime NHL-3.5Z CE sold by Lafarge ciments, usine du Cruas (composition: lime 89%, CEM II/A-LL 42.5 N CE PM-CP2 NF "white": 11%).

Portland Cement:

In accordance with the invention, the Portland cement conforms to that defined in the European standard EN 197-1, comprising five classes as follows: CEM I: Portland cement; CEM II: composite Portland cement; CEM III: blast-furnace cement; CEM IV: pozzolanic cement; CEM V: composite cement.

Mention may be made, by way of example, of the following: CEM I 42.5 R, Portland cement CEM I, 52.5N.

Alkali Metal Carbonate E

According to one noteworthy mode of the invention, component E may be lithium carbonate, potassium carbonate and/or sodium carbonate. Lithium carbonate is preferred.

Alkalifying Reagent F

F is a metal carbonate and/or bicarbonate, preferably $NaHCO_3$; $Na_2CO_3$; $K_2CO_3$, with $KHCO_3$ being preferred.

The amounts of [D] and [F] are sufficient to react in a formulation comprising the binder, aggregates, fillers, water and, optionally, additives, and to bring the pH of this wet formulation to a value of not less than 12, preferably not less than 13. This may correspond, for example, to the following ratios [F]/[D]:

0.2<[F]/[D]; preferably 0.2≤[F]/[D]≤1.5, and, more preferably still, 0.3≤[F]/[D]≤1.

The reaction is, for example, $Ca(OH)_2 + NaHCO_3 \rightarrow NaOH + CaCO_3$.

Binder G Different from A, B and D

G is preferably selected from the group comprising—or better still consisting of—: silica or silica-alumina binders, fly ashes, advantageously silica-alumina fly ashes, silica-calcium-alumina fly ashes, expanded or calcined clay dusts and/or metakaolins.

Possible examples include the metakaolins obtained by a flash process or a traditional process, and fly ashes of type C or F.

Dry Mortar Composition ABCDEF(G)HIJK

This composition is, for example, an adhesive mortar, a screed or a render. Components ABCDEF and their respective proportions are defined above. The aggregates or fillers H, the redispersible polymers I, the thickness J and the retarders K are defined below.

Aggregates or Fillers H

They are advantageously selected from the group comprising or, better still, consisting of: fillers and/or sands, preferably from silica, lime, silica-lime and magnesium-containing sands and mixtures thereof, silica, lime and silica-lime and magnesium-containing fillers and mixtures thereof, and/or from metal oxides, aluminas, and/or from glass beads and natural and synthetic silicate minerals preferably selected from clays, micas, metakaolins, silica fumes and mixtures thereof.

Redispersible Polymers I

I is selected from the group comprising or, better still, consisting of the following classes of resins: acrylic homo- or copolymers, ethylene-vinyl acetate copolymers, styrene-acrylic copolymers, terpolymers of vinyl acetate, vinyl versatate and dialkyl maleate, copolymers of vinyl acetate and vinyl versatate, copolymers of styrene and butadiene, and mixtures thereof.

Thickeners J

J is selected from the group comprising or, better still, consisting of polysaccharides and preferably cellulose ethers or starch ethers and mixtures thereof, and preferably from the group comprising methyl celluloses, hydroxyethyl celluloses, methylhydroxypropyl celluloses, methylhydroxy-ethyl celluloses and mixtures thereof, or from modified or unmodified guar ethers and mixtures thereof, or a mixture of these different classes.

Retarders K

K is selected from the group comprising or, better still, consisting of calcium-chelating agents, carboxylic acids and salts thereof, polysaccharides and derivatives thereof, phosphonates, lignosulfonates, phosphates, borates, and lead, zinc, copper, arsenic and antimony salts, and more particularly from tartaric acid and its salts, preferably its sodium or potassium salts, citric acid and its salts, preferably its sodium salt (trisodium citrate), sodium gluconates; sodium phosphonates; sulfates and their sodium or potassium salts, and mixtures thereof.

Various other additives may also be employed in the dry mortar composition, more particularly adhesive mortar composition.

These additives may be setting accelerators, water retainers, light fillers, water repellents, colourants, fibres, antifoams, rheological agents, air entrainers or foam-formers, gas-generating agents, flame retardants, etc., and mixtures thereof.

The setting accelerator additive may be selected from the group comprising or, better still, consisting of the alkali metal and alkaline earth metal salts of hydroxides, halides, nitrates, nitrites, carbonates, thiocyanates, sulfates, thiosulfates, perchlorates, silica, aluminium, and/or from carboxylic and hydroxycarboxylic acids and salts thereof, alkanolamines, insoluble silicate compounds such as silica fumes, fly ashes or natural pozzolans, quaternary ammonium silicates, finely divided inorganic compounds such as finely divided magnesium and/or calcium carbonates or silica gels, and mixtures thereof; said complementary setting accelerator (e) being preferably selected from the group comprising or, better still, consisting of chlorides and their sodium or calcium salts, carbonates and their sodium or lithium salts, sulfates and their sodium or potassium salts, calcium formates and hydroxides, and mixtures thereof.

The colourant additive is advantageously selected from the group comprising or, better still, consisting of organic and/or inorganic pigments, and more particularly from the oxides of iron, titanium, chromium, tin, nickel, cobalt, zinc and/or antimony, and/or from polysulfided sodium aluminosilicates, carbon, sulfides of cobalt, manganese, zinc, and/or from pigments which have high transparency or high reflectivity for infra-red radiation, and mixtures thereof.

The light filler additive is advantageously selected from the group comprising, or better still, consisting of: expanded perlite, expanded vermiculite, silica aerogels, expanded polystyrene, cenospheres (Fillites®), hollow alumina beads, expanded clays, pumices, hollow glass beads (3M® type) or expanded glass granules (Poraver®, Liaver®), silicate foam particles, and rhyolite (Noblite®).

The water repellent additive is advantageously selected from the group comprising or, better still, consisting of agents in the form of fluorine, silane, silicone and siloxane compounds, metal salts of fatty acids and mixtures thereof, and preferably from the sodium, potassium and/or magnesium salts of oleic and/or stearic acid and mixtures thereof.

The fibre additive preferably comprises mineral, animal, plant and synthetic fibres, more particularly selected from the group comprising or, better still, consisting of fibres of polyamide, polyacrylonitrile, polyacrylate, cellulose, polypropylene, polyvinyl alcohol, glass, metal, flax, polycarbonate, sisal, jute and hemp, and mixtures of these fibres.

The antifoam additive is preferably selected from the group comprising or, better still, consisting of polyether polyols, hydrocarbon molecules, silicone molecules, hydrophobic esters, nonionic surfactants, polyoxiranes, and mixtures thereof.

The rheological additive is preferably selected from the group comprising or, better still, consisting of thickeners, plasticizers (organic and/or inorganic) and mixtures thereof, and preferably from the subgroup comprising or, better still, consisting of polysaccharides and derivatives thereof, polyvinyl alcohols, inorganic thickeners, linear polyacrylamides, polynaphthalene sulfonates, polymelamine sulfonates, polycarboxylate ethers, polycarboxylate esters and mixtures thereof.

The surfactant additive is anionic, nonionic or amphoteric.

The sources of anionic surfactants are, for example, alkyl sulfates, alkyl ether sulfates, alkarylsulfonates, alkylsuccinates, alkylsulfosuccinates, alkoyl sarcosinates, alkyl phosphates, alkyl ether phosphates, alkyl ether carboxylates, and/or alpha-olefinsulfonates, and preferably sodium lauryl sulfate.

The nonionic surfactants are, for example, ethoxylated fatty alcohols, mono- or dialkyl alkanolamides, and/or alkyl polyglucosides.

The amphoteric surfactants are, for example, alkyl amine oxides, alkyl betaïnes, alkyl amido propyl betaïnes, alkyl sulfobetaïnes, alkyl glycinates, alkyl amphopropionates, and/or alkyl amidopropyl hydroxysultaïnes.

The in situ gas generator additive is advantageously selected from those adjuvants which, in contact with the compositions according to the invention, generate oxygen, hydrogen, nitrogen, carbon monoxide or dioxide, ammonia or methane. They may be selected from the adjuvants described in U.S. Pat. No. 7,288,147, and more particularly from the classes of the azodicarbonamides, sodium bicarbonate, organic or inorganic peroxides, toluene sulfonyl hydrazide, benzene sulfonyl hydrazide, toluene sulfonyl acetone hydrazone, toluene sulfonyl semicarbazide, phenyltetrazole, sodium borohydride and dinitrosopentamethylenetetramine.

The flame retardant additive is advantageously selected from the group comprising or, better still, consisting of flame-retarding agents having chemical and/or physical activities, halogenated flame retardants, phosphorus-containing flame retardants, nitrogen-containing flame retardants, intumescent systems, inorganic flame retardants, metal hydroxides, zinc compounds, borates, antimony oxides, nanocomposites based on clays based on aluminium silicates, and mixtures thereof; and preferably from the subgroup comprising or, better still, consisting of Tetrachlorobisphenol A (TBBPA), chlorinated paraffins, organic phosphates, red phosphorus, phosphonates, phosphinates, melamine, its salts and homologues, aluminium hydroxides or magnesium hydroxides, zinc hydroxystannates, zinc borate, and mixtures thereof.

Activating System

The invention likewise relates to an activated system CDEF for a binder AB.

Wet Formulation

The invention likewise relates to a wet formulation obtained from the dry composition defined above mixed with water, preferably according to a mixing rate of between 10 and 35%, preferably between 15 and 30%.

Process for Preparing a Wet Formulation

The invention likewise relates to a process for preparing the wet formulation above.

Use of an Activating System

The invention likewise relates to the use of an activating system CDEF for a binder AB.

Hardened Products for Construction

The invention is also directed to the hardened products for construction that are obtained starting from the above wet formulation and/or from that obtained by the process defined below, these hardened products being, in particular, as follows: products obtained on the building site by hardening the wet formulations resulting from the mixing of the compositions according to the invention, e.g.: adhesive mortars, seals, patching renders, smoothing renders; screeds, lightweight screeds for heated floors; exterior coatings in the form of thick-film or thin-film mineral coatings and mineral paints; components of exterior thermal insulation (ETI) systems, including the adhesive for insulating material, the undercoat used to fix the mesh, and the exterior finishing coat; tiling adhesives; tiling seals; jointing renders; interior and exterior renders, for example single-coat renders; insulating material for the exterior or interior of buildings; filling mortars or concretes; grouting mortar, mortars for concrete repair, mortars with freeze-thaw resistance, a concrete waterproofing system, sealing membranes; injection slurries, lightweight slurries for the cementation of oil wells; lightweight mortars or concretes intended for placement by spraying or pouring into hollow walls or into permanent formwork for the production of new buildings or the renovation of old buildings; products prefabricated industrially by hardening the wet formulations resulting from the mixing of the compositions according to the invention, e.g.: lightweight prefabricated panels intended for the assembly of buildings (load-bearing elements or insulating panels); lightweight concrete blocks for the use as structural or insulating or facing elements; prefabricated elements, such as window sills, brackets, mouldings, etc.

Construction or Civil Engineering Works

The invention also relates to construction or civil engineering works carried out at least partly with a wet formulation, this formulation hardening after it has been applied and shaped, or on the basis of the hardened construction products.

Processes

The invention also relates to processes for preparing the dry composition above, the process for applying the wet formulation defined above to a building surface, or the process for producing hardened products for construction, for building or civil engineering works, by means of the wet formulation according to the invention.

EXAMPLES

Examples 1 to 3

Table 1 below gives the formulas of three adhesive mortar compositions—C2S, C2S2 and C2F—according to examples 1, 2 and 3

I. Materials Used

Binder A, ground and granulated blast-furnace slag: Ecocem® ground slag

Component B: TERNAL® RG calcium aluminate cement from Imerys® Aluminates —$CaO \cdot Al_2O_3$-$2CaO \cdot Al_2O_3 \cdot SiO_2$-$12CaO \cdot 7Al_2O_3$-$2CaO \cdot SiO_2$-$4CaO \cdot Al_2O_3 \cdot Fe_2O_3$ Component C: source of sulfate ions: "SULFACAL AH Micro AF" $CaSO_4$, micronized anhydrite from SMA FAULQUEMONT 57

Component D: Tradical® H90 from LHOIST (Précy sur Oise/U59)

Component H:
  1) natural calcium carbonate BL200 sold by Omya
  2) Dried washed sand PE2LS—Fulchiron Component I: redispersible polymer based on a vinyl acetate/vinyl chloride/ethylene copolymer, having a minimum film-forming temperature of 5° C.

Component J: hydroxyethylmethylcellulose (NEMC) with MW 40 000 or Opagel CMT pregelatinized starch ether 500-1500 mPa·s from AVEBE®

Component E: lithium carbonate from RODACHEM BV

Component F: alkalifying reagent $NaHCO_3$ from BRENNTAG SA

Retarder K: tartaric acid from Ets FAURE et FILS, trisodium citrate from BRENNTAG SA, sodium gluconates from UNIVAR, citric acid from UNIVAR.

II. Tests:

The standard employed for the test of determining the flexural and compressive strengths is NF EN 196-1.

III. Preparation of Mortars:

Procedure

Preparation of Dry Mixes:

The powdered starting materials are weighed out independently in accordance with the formulations. The starting materials are then mixed in a Guedu powder mixer for 3 minutes.

Water Mixing of the Dry Mixes

The dry mortars obtained are mixed with the water required to produce a homogeneous paste, in a Perrier planetary mixer, for one minute and thirty seconds.

TABLE 1

| SM | Type | C₂S₁ Example 1 % | C₂S₂ Example 2 % | C₂F Example 3 % |
|---|---|---|---|---|
| ECOCEM FOS slag | Binder A (ground and granulated blast-furnace slag) | 22.5 | 29.5 | 27 |
| Ternal RG (Imerys Aluminates) | B: calcium aluminate cement | 2.5 | 2.5 | 7 |
| Micronized anhydrite | C: Source of sulfate ions, $CaSO_4$ | 4 | 4 | 7 |
| Tradical H90 (Précy sur Oise/U59) | D: $Ca(OH)_2$ CL90 | 0.9 | 0.9 | 0.9 |
| BL200EN | H: $CaCO_3$ aggregate/filler | 2.5 | 0 | 0 |
| PE2LS | H: silica sand aggregate/filler 0.1-0.4 mm | 64.1 | 57.22 | 55.01 |

TABLE 1-continued

| SM | Type | $C_2S_1$ Example 1 % | $C_2S_2$ Example 2 % | $C_2F$ Example 3 % |
|---|---|---|---|---|
| Redispersible polymer | I: copolymer of vinyl acetate, vinyl chloride and ethylene, having a minimum film-forming temperature of 5° C. | 2.5 | 5 | 2 |
| Thickener J1 | J1: Hydroxyethylmethyl cellulose | 0.25 | 0.25 | 0.25 |
| Thickener J2 | HEMC 35 000-45 000 mPas J2: pregelatinized starch ether 500-1500 mPas | 0.1 | 0 | 0 |
| Lithium carbonate | E: $Li_2CO_3$ | 0.1 | 0.1 | 0.1 |
| Sodium bicarbonate | F: alkalifying reagent, $NaHCO_3$ | 0.4 | 0.4 | 0.4 |
| | K: mixture of retarders | 0.15 | 0.13 | 0.34 |
| | $CO_2$ footprint (kg/t) | 182 | 256 | 189 |

IV. Results

TABLE 2

| | Example 1 | Example 2 | Example 3 |
|---|---|---|---|
| Water demand (%) | 22 | 23.5 | 24.5 |
| Viscosity (Pa s) | 330 | 290 | 310 |
| Adhesion (MPa) 6 hours | — | — | 0.55 |
| Adhesion (MPa) 24 hours at 20° C. | 0.48 | 0.51 | 0.75 |
| Adhesion (MPa) 24 hours at 5° C. | 0.30 | — | 0.48 |
| Adhesion (MPa) 28 days | 1.41 | 1.45 | 1.66 |
| Wet adhesion (MPa) 28 days | 1.60 | 1.91 | 1.28 |
| Adhesion (MPa) with respect to heat, 28 days | 1.46 | 1.63 | 1.71 |
| Adhesion (MPa) open time 30 minutes | 0.89 | 1.11 | 1.19 |
| Deformability mm/m | 2.64 | 5.12 | NC |
| % transfer 10 mm | 100 | 100 | 100 |
| % transfer 15 mm | 100 | 100 | 90 |
| % transfer 20 mm | 80 | 95 | 90 |
| % transfer 25 mm | 70 | 90 | 90 |
| % transfer 30 mm | 40 | 45 | 80 |

V. Comments:

The binder, the activating system and the mortars, more particularly the adhesive mortars, according to the invention (based on ground granulated blast-furnace slag with a low carbon footprint) are economical, exhibit a good open time and good transfer, have a satisfactory setting time at 5 and 20° C., possess high deformability with low levels of redispersible polymer, and do not require corrosive "Xi" labelling on the bags of dry mortar.

The wet formulations according to the invention also have good handling qualities, making them easier to use.

Examples 4 to 8

Tables 3 and 4 below give the formulas and the performance properties of three C2S1 adhesive mortar compositions and of two C2F adhesive mortar compositions. The materials employed, the preparation of the mortars and the tests are the same as for examples 1 to 3.

TABLE 3

| Components of the compositions according to the invention | Components | C2S1 ADHESIVE | | |
|---|---|---|---|---|
| | | Example 4 | Example 5 | Example 6 |
| | | Percentage in the mortar formula | | |
| | | (%) | (%) | (%) |
| A | GGBS | 29.5 | 29.5 | 22.5 |
| B | CAC | 2.5 | 2.5 | 2.5 |
| C | C$ | 4 | 4 | 4 |
| D | Ca(OH)2 | 0.9 | 0.9 | 0.9 |
| E | Li2CO3 | 0 | 0.1 | 0.1 |
| F | NaHCO3 | 0.4 | 0.4 | 0.4 |
| | | Percentage expressed at 100% relative to the binder | | |
| | | (%) | (%) | (%) |
| A | GGBS | 79 | 79 | 74 |
| B | CAC | 7 | 7 | 8 |
| C | C$ | 11 | 11 | 13 |

TABLE 3-continued

| | | | | |
|---|---|---|---|---|
| D | Ca(OH)2 | 2.41 | 2.41 | 2.96 |
| E | Li2CO3 | 0 | 0.27 | 0.33 |
| F | NaHCO3 | 1.07 | 1.07 | 1.32 |
| Performance property | Adhesion in water (MPa) | 0.53 | 1.91 | 1.17 |
| | Ratio C/A | 0.14 | 0.14 | 0.18 |
| | Ratio C/B | 1.60 | 1.60 | 1.60 |
| | Ratio F/D | 0.44 | 0.44 | 0.44 |

TABLE 4

| Components of | | C2S1 ADHESIVE | |
|---|---|---|---|
| the compositions according to the | | Example 7 | Example 8 |
| | | Percentage in the formula of mortar | |
| invention: | Components: | (%) | (%) |
| A | GGBS | 27 | 27 |
| B | CAC | 7 | 7 |
| C | C$ | 5.6 | 7 |
| D | Ca(OH)2 | 0.9 | 0.9 |
| E | Li2CO3 | 0.1 | 0.1 |
| F | NaHCO3 | 0.4 | 0.4 |
| | | Percentages expressed at 100% relative to the binder | |
| | | (%) | (%) |
| A | GGBS | 66 | 64 |
| B | CAC | 17 | 17 |
| C | C$ | 14 | 17 |
| D | Ca(OH)2 | 2.2 | 2.12 |
| E | Li2CO3 | 0.24 | 0.24 |
| F | NaHCO3 | 0.98 | 0.94 |
| Performance property | Adhesion in water (MPa) | 0.77 | 1.22 |
| | Ratio C/A | 0.21 | 0.26 |
| | Ratio C/B | 0.80 | 1.00 |
| | Ratio F/D | 0.44 | 0.44 |

Examples 9 and 10

Table 5 below gives the formulas and the performance properties of two screed compositions. The preparation of the mortars and the tests are the same as for examples 1 to 8.

TABLE 5

| | Screed composition | Example 9 | Example 10 |
|---|---|---|---|
| A | ECOCEM Dunkirk slag | 9.5 | 5.4 |
| D Ca(OH)$_2$ | Tradical H90 (Précy) | 0.9 | 0.9 |
| C CaSO$_4$ | Prestia Selecta | 2.5 | |
| C CaSO$_4$ | Sulfacal Micro AF | | 4.5 |
| B CAC | Ternal RG | 5.51 | 8.1 |
| H sand | Parcay 1/2 | 9.72 | 9.72 |
| H sand | MI 0.1/1.2 | 38.1 | 38.1 |
| H sand | Filler DC8 | 15 | 15 |
| H sand | PE2LS | 16.19 | 16.19 |
| I polymer | I1: copolymer of vinyl acetate, vinyl chloride and ethylene, having a minimum film-forming temperature of 5° C. | 1.7 | 1.7 |
| I polymer | I2: mixture of hydrocarbon liquids and polyglycols on an inert support having a bulk density of 330 g/l | 0.05 | 0.05 |

TABLE 5-continued

| | Screed composition | Example 9 | Example 10 |
|---|---|---|---|
| I polymer | I3: modified polycarboxyl ethers having a density of between 300 and 600 kg/m3 | 0.15 | 0.15 |
| E | Lithium carbonate | 0.1 | 0.1 |
| K retarder | K1 | 0.1 | 0.3 |
| J thickener | J: biopolymer gum | 0.12 | 0.12 |
| F alkalifying reagent | Sodium bicarbonate (pharm. Gr 13/27) | 0.4 | 0.4 |
| | Mixing rate (%) | 17 | 17 |
| | Initial flow (sec) | 15 | 18 |
| | Slump flow (mm) | 133 | 125 |
| | | / | 125 |
| | | / | 128 |
| | Settling | no | no |
| | Setting time | 12 | 40 |
| | DP | 35 | 57 |
| | FP | 55 | 75 |
| | Flexural strength 24 h (MPa) | 3.4 | 5.24 |
| | Compressive strength 24 h (MPa) | 8.4 | 11.5 |
| | Flexural strength 28 d (MPa) | / | / |
| | Compressive strength 28 d (MPa) | 14.72 | 20.76 |

Examples 11 to 12

Table 6 below gives the formulas and performance properties of two adhesive mortar compositions. The preparation of the mortars and the tests are the same as for examples 1 to 10

TABLE 6

| Components of the | | C2S1 ADHESIVE | |
|---|---|---|---|
| compositions according to the | | Example 11 | Example 12 |
| | | Percentage in the formula of the mortar | |
| invention: | Components: | (%) | (%) |
| A | GGBS | 22.5 | 22.5 |
| B | CAC | 2.5 | 2.5 |
| C | C$ | 4 | 6 |
| D | Ca(OH)2 | 0.9 | 0.9 |
| D | Portland cement | 2 | 0 |
| E | Li2CO3 | 0.1 | 0.1 |
| F | NaHCO3 | 0.4 | 0.4 |
| | | Percentages expressed at 100% relative to the binder | |
| | | (%) | (%) |
| A | GGBS | 69.4 | 69.4 |
| B | CAC | 7.7 | 7.7 |
| C | C$ | 12.3 | 18.5 |
| D | Ca(OH)2 | 2.8 | 2.8 |
| D | Portland cement | 6.2 | 0 |
| E | Li2CO3 | 0.3 | 0.3 |
| F | NaHCO3 | 1.2 | 1.2 |
| Performance property | Adhesion in water (MPa) | 0.75 | 0.76 |
| | Ratio C/A | 0.18 | 0.27 |
| | Ratio C/B | 1.6 | 2.4 |
| | Ratio F/D | 0.13 | 0.43 | thetic gypsum, calcium sulfate hemihydrate, bassanite, anhydrite, selenite, alabaster, fibrous gypsum, saccharoidal gypsum, marine gypsum, gypsum flower, phosphogypsum, desulfurization gypsum, titanogypsum, citrogypsum, tartarogypsum, borogypsum, lactogypsum and mixtures thereof;

The invention claimed is:

1. A hydraulic binder comprising, in % by dry weight:
A. at least 50 of at least one ground and granulated blast-furnace slag;
B. more than 5 of at least one calcium aluminate cement and/or of at least one calcium sulfoaluminate cement;
C. between 6 and 30 of at least one source of sulfate ions selected from the group consisting of natural or syn- D. between 1 and 5 of $Ca(OH)_2$ and/or of Portland cement;

E. between 0.01 and 1 of at least one alkali metal carbonate;

F. and at least one alkalifying reagent consisting of at least one alkali metal carbonate and/or bicarbonate, different from E;

subject to the following conditions:

(i) an amount of C is sufficient to allow the sulfate ions of C to react with B and with A;

(ii) the amount of F is sufficient so that its reaction with component D in a presence of water brings the pH of a resulting wet formulation to a value of not less than 12, for a water-to-binder mixing rate of between 10 and 35% by weight, wherein $1 \leq [C]/[B] \leq 3$; and wherein the hydraulic binder is free from any polyvinyl alcohol.

2. The hydraulic binder according to claim 1, wherein $0.1 < [C]/[A]$.

3. The hydraulic binder according to claim 1, comprising, in % by dry weight:

A. 55 to 90 of at least one ground and granulated blast-furnace slag;

B. 5.5 to 30 of at least one calcium aluminate cement and/or of at least one calcium sulfoaluminate cement;

C. 6 to 30 of at least one source of sulfate ions with $1 \leq [C]/[B] \leq 3$;

D. 1 to 5 of $Ca(OH)_2$ and/or of Portland cement;

E. 0.01 to 1 of $Li_2CO_3$;

F. and at least one alkalifying reagent consisting of at least one alkali metal carbonate and/or bicarbonate, different from E;

G. 0 to 10 of at least one binder different from A, B and D, comprising: silica or silica-alumina binders, fly ashes, advantageously silica-alumina fly ashes, silica-calcium-alumina fly ashes, expanded or calcined clay dusts and/or metakaolins.

4. A dry mortar composition comprising a binder according to claim 1.

5. The dry mortar composition according to claim 4, wherein the dry mortar composition is an adhesive mortar and in that it comprises, in % by dry weight:

A. 10 to 50 of at least one ground and granulated blast-furnace slag;

B. 0.5 to 20 of at least one calcium aluminate cement and/or of at least one calcium sulfoaluminate cement;

C. between 2 and 15 of at least one source of sulfate ions with $1 \leq [C]/[B] \leq 3$, wherein the at least one source of sulfate ions is selected from the group consisting of natural or synthetic gypsum, calcium sulfate hemihydrate, bassanite, anhydrite, selenite, alabaster, fibrous gypsum, saccharoidal gypsum, marine gypsum, gypsum flower, phosphogypsum, desulfurization gypsum, titanogypsum, citrogypsum, tartarogypsum, borogypsum, lactogypsum and mixtures thereof;

D. 0.05 to 5 of $Ca(OH)_2$ and/or of Portland cement;

E. 0.02 to 0.8 of $Li_2CO_3$;

F. and at least one alkalifying reagent consisting of at least one alkali metal carbonate and/or bicarbonate, different from E;

G. 30 to 80 of at least one type of aggregates;

H. 1 to 10 of at least one redispersible polymer;

I. 0.01 to 5 of at least one thickener;

J. 0.01 to 0.5 of at least retarder.

6. The dry mortar composition according to claim 4, wherein the dry mortar composition is a screed or a render and in that it comprises, in % by dry weight:

A. 3 to 50 of at least one ground and granulated blast-furnace slag;

B. 0.5 to 20 of at least one calcium aluminate cement and/or of at least one calcium sulfoaluminate cement;

C. between 2 and 15 of at least one source of sulfate ions with $1 \leq [C]/[B] \leq 3$, wherein the at least one source of sulfate ions is selected from the group consisting of natural or synthetic gypsum, calcium sulfate hemihydrate, bassanite, anhydrite, selenite, alabaster, fibrous gypsum, saccharoidal gypsum, marine gypsum, gypsum flower, phosphogypsum, desulfurization gypsum, titanogypsum, citrogypsum, tartarogypsum, borogypsum, lactogypsum and mixtures thereof;

D. 0.05 to 5 of $Ca(OH)_2$ and/or of Portland cement;

E. 0.02 to 0.8 of $Li_2CO_3$;

F. and at least one alkalifying reagent consisting of at least one alkali metal carbonate and/or bicarbonate, different from E;

G. 30 to 80 of at least one type of aggregates;

H. 1 to 10 of at least one redispersible polymer;

I. 0.01 to 5 of at least one thickener;

J. 0.01 to 0.5 of at least retarder.

* * * * *